R. J. COLES.
THREE WHEEL DRIVE TRACTOR.
APPLICATION FILED FEB. 21, 1918.

1,280,962.

Patented Oct. 8, 1918.
2 SHEETS—SHEET 1.

Inventor:
Ralph J. Coles,
by Hazard & Miller
Attys.

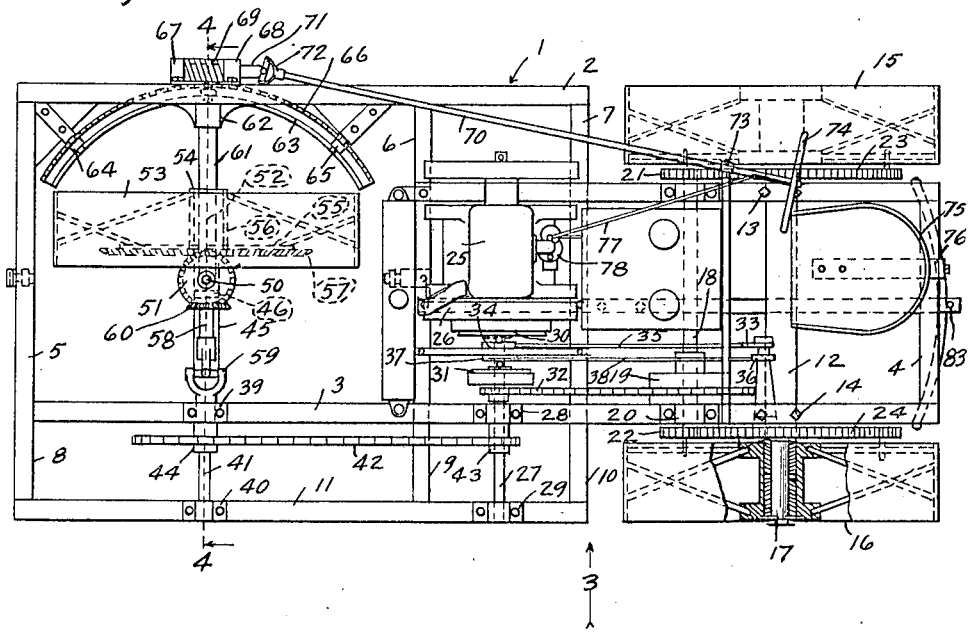

UNITED STATES PATENT OFFICE.

RALPH J. COLES, OF LOS ANGELES, CALIFORNIA.

THREE-WHEEL-DRIVE TRACTOR.

1,280,962.  Specification of Letters Patent.  Patented Oct. 8, 1918.

Application filed February 21, 1918. Serial No. 218,466.

*To all whom it may concern:*

Be it known that I, RALPH J. COLES, a citizen of the United States, residing at Los Angeles, in the county of Los Angeles and State of California, have invented new and useful Improvements in Three-Wheel-Drive Tractors, of which the following is a specification.

My object is to make a three wheel drive tractor in which the steering wheel may be driven simultaneously with the non-steering wheels and in which the steering wheel may be driven independently of the non-steering wheels, so that the tractor may be turned in either direction upon the center between the non-steering wheels, and my invention consists in the novel features herein shown, described and claimed.

Fig. 2 is a top plan view of the complete three wheel drive tractor.

Fig. 3 is a side elevation looking in the direction indicated by the arrow 3 in Fig. 2.

Figure 1:
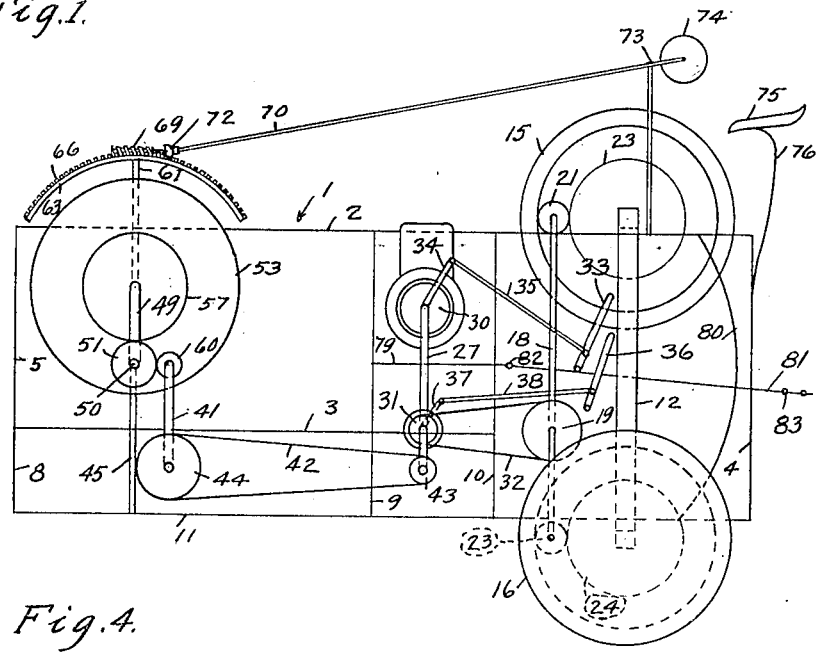
Figure 1 is a diagrammatic view of the working parts of a three wheel drive tractor embodying the principles of my invention.
Figure 4:
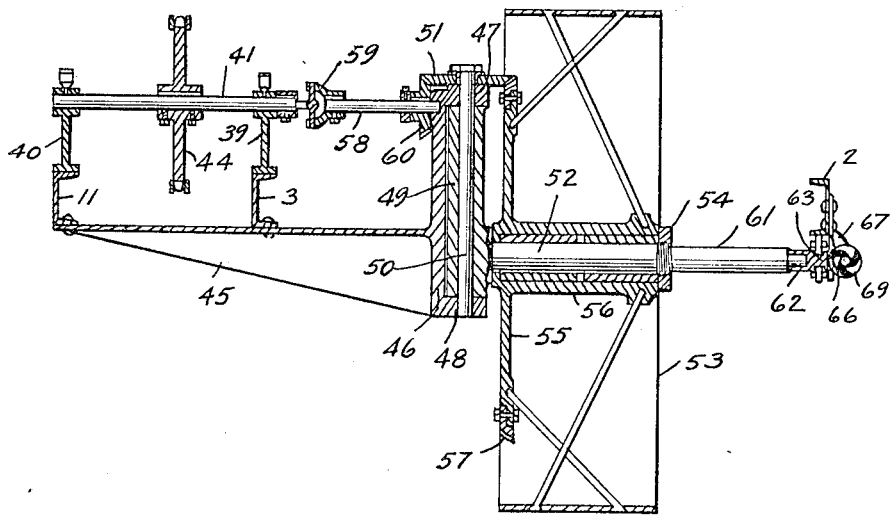
Fig. 4 is an enlarged vertical cross sectional detail on the line 4—4 of Fig. 2.

The frame 1 comprises parallel side bars 2 and 3, a rear end bar 4, a front end bar 5, cross bars 6 and 7, extensions 8, 9 and 10 extending outwardly beyond the side bar 3 from the bars 5, 6 and 7, and the extension side bar 11 upon the outer ends of the extensions.

The rigid non-steering wheel axle 12 is secured to the side bars 2 and 3 by U-bolt clamps 13 and 14, and the non-steering wheels 15 and 16 are loosely mounted upon spindles 17 upon the ends of the axle 12. The differential shaft 18 carrying the differential gear 19 is mounted in bearings 20 fixed upon the side bars 2 and 3 and parallel with the axle 12. Driving pinions 21 and 22 are fixed upon the ends of the differential shaft 18 and mesh with the driven gears 23 and 24 fixed to the non-steering wheels 15 and 16. The engine 25 is mounted upon the cross bars 6 and 7 and has a fly wheel 26 mounted upon its crank shaft. The driving shaft 27 is mounted in bearings 28 and 29 fixed upon the side bar 3 and extension side bar 11 in line with the crank shaft of the engine, and a clutch 30 is adapted to connect the shaft 27 to the crank shaft. A second clutch 31 is mounted upon the shaft 27 and connected to the differential gear 19 by a sprocket chain 32. A hand-lever 33 is connected to the crank arm 34 by a link 35 and the crank arm 34 is connected to operate the clutch mechanism 30, so that by manipulating the hand-lever 33 the shaft 27 may be connected to or disconnected from the engine. A hand-lever 36 is connected to the crank arm 37 by a link 38, said crank arm 37 being connected to the clutch mechanism 31, so that by manipulating the hand-lever 36 the differential gear 19 driving the non-steering wheels 15 and 16 may be connected to or disconnected from the shaft 27 and so that by disconnecting the clutch 31 and connecting the clutch 30 the shaft 27 may run without running the non-steering wheels.

Bearing blocks 39 and 40 are mounted in transverse alinement upon the side bar 3 and the extension side bar 11, and the steering wheel drive shaft 41 is mounted in these bearing blocks. A sprocket chain 42 connects the sprocket 43 upon the drive shaft 27 to the sprocket 44 upon the drive shaft 41. A bracket 45 is secured to the lower sides of the side bar 3 and extension side bar 11 and extends transversely of the main frame below the shaft 41 to the center of the frame. A vertical bearing block 46 is formed integral with the inner end of the bracket 45 and has rigid vertical bearings 47 and 48 at its upper and lower ends. A swiveled bearing block 49 fits between the bearings 47 and 48 and a pin 50 is inserted downwardly through a bevel gear 51, through the bearing 47, through the swiveled bearing block 49, and through the bearing 48. A stub-axle 52 extends horizontally from the lower end of the bearing block 49 and the steering wheel 53 is rotatably mounted upon this axle and held in position by a nut 54. An annular web 55 extends from the inner end of the hub 56 of the wheel 53 and a bevel gear 57 is secured to the outer edge of the web 55 in mesh with the bevel gear 51. An extension shaft 58 is mounted in the upper end of the bearing block 46 in line with the shaft 41 and is connected to the shaft 41 by a tumbling rod joint 59 and has a bevel gear 60 upon its inner end in mesh with the bevel gear 51, so that when the hand-lever 33 is operated to connect the clutch 30 and drive the shaft 27 from the engine, the steering wheel 53 will be driven forwardly.

An extension arm 61 extends outwardly from the stub-axle 52 and its outer end is mounted in a bearing 62. The double segmental track bar 63 is formed integral with the bearing 62, said track bar being mounted horizontally between pairs of rollers 64 and 65, one roller of each pair being above the track bar and the other roller of each pair being below the track bar, and the track bar being concentric to the pin 50. A worm gear rack 66 extends outwardly from the track bar 63. Worm gear bearings 67 and 68 are mounted upon the outer side of the side bar 2, and a worm 69 is mounted in mesh with the rack 66. A steering wheel shaft 70 is connected to the stem 71 of the worm 69 by a tumbling rod joint 72, the rear end of the shaft 70 being mounted in a bearing 73 extending upwardly from the rear end of the frame 1, and a hand-wheel 74 is fixed upon the rear end of the shaft 70 within reach of an operator sitting upon the seat 75, so that by manipulating the hand-wheel 74 the steering wheel 53 may be turned in a horizontal plane as required to guide the tractor.

The seat 75 is mounted upon a spring 76 secured to the rear cross bar 4 and extending upwardly and forwardly.

The rod 77 is connected to the throttle of the carbureter 78 and extends backwardly to a position within reach of the operator.

After the engine 25 is started, the operator takes his place upon the seat 75 and operates the hand-lever 36 to connect the clutch 31 and the hand-lever 33 to connect the clutch 30. Then the operation of the engine will drive the steering wheel 53 and the non-steering wheels 15 and 16. Then the operator manipulates the hand-wheel 74 to guide the tractor to the right or left. When it is desired to turn shortly either way, the hand-lever 36 is operated to disconnect the clutch 31 and continued operation of the engine will drive the steering wheel 53 without driving the non-steering wheels 15 and 16, thus making it possible to turn the tractor upon a center half way between the non-steering wheels.

A brace 79 connects the intermediate cross bars 6 and 7 and extends backwardly beyond the bar 7. A stirrup 80 is connected at its upper ends to the rear ends of the side bars 2 and 3 and a draw bar 81 is connected to the rear end of the brace 79 by a bolt 82 and extends rearwardly over the stirrup 80 to a position beyond the rear ends of the side bars 2 and 3, there being a bolt hole 83 in the rear end of the draw bar for the reception of a clevis pin or the like for attaching a trailer or the like to the tractor. The draw bar 81 may swing laterally either way upon the stirrup 80 to the side bars 2 and 3.

Various changes may be made in the details of construction without departing from the spirit of my invention as claimed.

I claim:

1. In a tractor, vertical bearings, a bearing block fitting between the vertical bearings, a pin inserted vertically through the vertical bearings and through the bearing block, a stub-axle extending from the bearing block, a steering wheel on the stub-axle, an extension arm extending from the stub-axle, a segmental track bar mounted to travel in a circular horizontal plane and supporting the outer end of the extension arm, a worm gear rack upon the track bar, a worm meshing with the worm gear rack, and means for operating the worm; so that by manipulating the worm the steering wheel is guided.

2. In a tractor, vertical bearings, a bearing block fitting between the vertical bearings, a pin inserted vertically through the vertical bearings and through the bearing block, a stub-axle extending from the bearing block, a steering wheel on the stub-axle, an extension arm extending from the stub-axle, a segmental track bar mounted to travel in a circular horizontal plane and supporting the outer end of the extension arm, a worm gear rack upon the track bar, a worm meshing with the worm gear rack, means for operating the worm; so that by manipulating the worm the steering wheel is guided; a bevel gear carried by the steering wheel concentric to the stub-axle, a second bevel gear mounted to rotate upon the pin in mesh with the first bevel gear, a driving shaft, a third bevel gear upon the driving shaft in mesh with the second bevel gear, and means for operating the driving shaft.

In testimony whereof I have signed my name to this specification.

R. J. COLES.

Copies of this patent may be obtained for five cents each, by addressing the "Commissioner of Patents, Washington, D. C."